Feb. 21, 1956 L. R. SNYDER 2,735,636
MOUNTING DEVICE FOR VACUUM TUBES
Filed April 20, 1953
FIG. 1
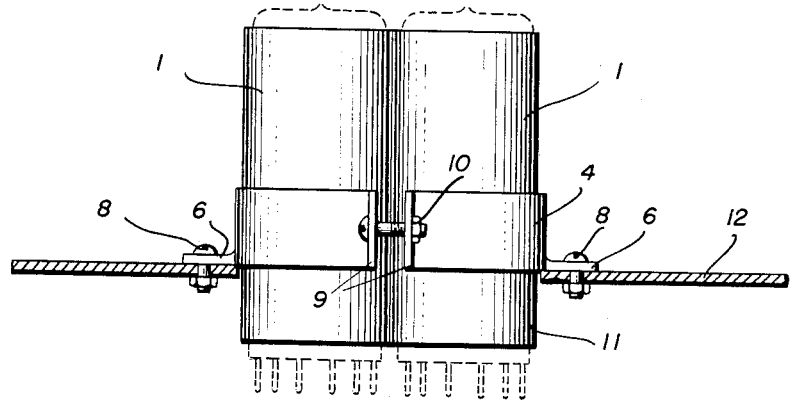
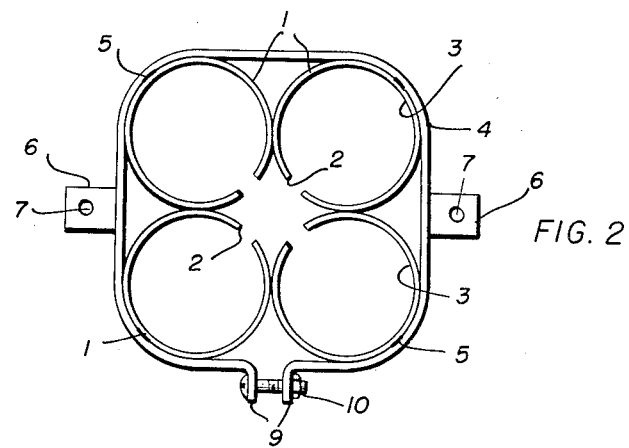
FIG. 2
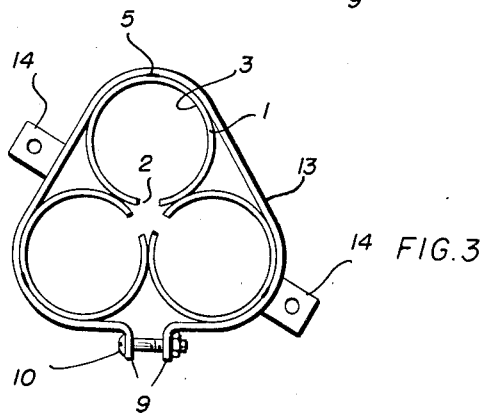
FIG. 3
INVENTOR.
LESTER R. SNYDER
BY
ATTORNEYS

United States Patent Office 2,735,636
Patented Feb. 21, 1956

2,735,636

MOUNTING DEVICE FOR VACUUM TUBES

Lester R. Snyder, Fort Wayne, Ind., assignor to Farnsworth Research Corporation

Application April 20, 1953, Serial No. 349,749

6 Claims. (Cl. 248—27)

The present invention relates to a mounting device for vacuum tubes and more particularly to a tube holding arrangement adapted to mount securely a plurality of vacuum tubes on the chassis of a component of electronic equipment.

As a general consideration, it is usually desirable to design and construct component pieces or entire sets of electronic equipment in as compact a space as possible, such arrangements normally conducing to economy of construction and conservation of space which may be occupied by other equipment. In the design and construction of electronic equipment, it is conventional practice to space the many vacuum tubes used therein suitable distances apart. The reasons for such spacing are well known to persons skilled in the art, and include the provision of proper ventilation for the individual tubes as well as the prevention of electrical interaction between the tubes themselves which, in most instances, is undesirable.

In view of the foregoing it is an object of this invention to provide a mounting device for securing a plurality of vacuum tubes in a component piece of electronic equipment in such a manner as to conserve space, preserve proper ventilation of the tubes, and improve the economy in time and effort for assembling such equipment.

It is another object of this invention to provide a tube holding device which serves to conduct efficiently the heat from the associated vacuum tubes.

It is still another object of this invention to provide a tube holder construction adapted for securing a plurality of vacuum tubes in place without sacrificing the operational features mentioned in the foregoing.

It is yet another object of this invention to provide a tube holder assembly, arranged for securing a plurality of vacuum tubes in position, which serves to conserve space and to provide improved dissipation of heat from all of the tubes.

It is a further object to provide a cluster of assembled tube holders which are independently and aggregatively adjustable to provide suitable and proper gripping force for securing a plurality of tubes in position the cluster being conveniently operable to facilitate the removal and insertion of tubes in the respective holders.

Other objects will become apparent as the description proceeds.

For a better understanding of the invention, together with other and further objects thereof, reference is made to the following description, taken in connection with the accompanying drawings, the scope of the invention being defined by the appended claims.

In the accompanying drawings:

Fig. 1 is a side elevation of an embodiment of this invention, shown as mounted on a base plate of a conventional metal chassis;

Fig. 2 is a top plan view of the embodiment of Fig. 1; and

Fig. 3 is a top plan view of an alternative embodiment of this invention.

Referring to the drawings, and more particularly to Figs. 1 and 2, a tube holding assembly is shown as being comprised of four tubular or cylindrical bodies 1 which are preferably made of either aluminum or copper for facilitating the dissipation of heat from the various electron tubes and for serving as electrostatic shields for said electron tubes. Each cylindrical body or holder 1 is provided with a slot 2 which may extend from one end to the other thereof whereby the size of the tube-receiving opening 3 may be adjusted by exerting radial bending pressure on the holder. Thus, by the use of the slot 2, the individual holder may be preformed with the fingers to accommodate the tolerance dimensional differences between different tubes of the same type. When properly adjusted, the spring tension of the slotted holder serves to grip lightly the tube for holding it in position.

As seen more clearly in Fig. 2, the four holders 1 are bundled or grouped into contacting assembly with all of the slots 2 being positioned symmetrically adjacent the center of the assembly. These holders are held in such position by means of a metal strap 4 by spot welding, brazing, or other suitable means at the various places 5 located near the axial center of the assembly. This strap is provided with two oppositely extending ears 6 apertured at 7 to receive mounting screws 8. The ends 9 of the strap are bent outwardly to provide pressure flanges apertured to receive the retaining screw assembly 10 for clamping the strap 4 securely around the clustered holders. As will be seen from an examination of Fig. 2, tightening of the screw assembly 10 will result in all of the holders 1 being symmetrically compressed inwardly, and when tubes are mounted in these holders, such tightening of the screw 10 will serve to clamp securely all said tubes in position. If one tube should have a diameter larger than the others, such tube will probably be the first to be tightly gripped, but this is not of concern since the other holders which have not as yet gripped the respective tubes will give or flex inwardly into gripping engagement with the remaining tubes thereby preventing the first tube from being crushed by progressive tightening of the screw 10. Thus by means of the single adjustment 10, four tubes in respective tube holders can be properly secured in assembled position with each tube being gripped by approximately the same holding force.

In the preferred arrangement, each individual holder 1 is preadjusted so as to receive snugly its respective tube so that snug tightening of the screw 10 serves the purpose of preserving this snug holder grip while at the same time serves to secure all of the holders against relative movement and vibration.

As seen in Fig. 1, an opening 11 in the chassis base plate 12 receives the clustered tube holders, with the ears 6 engaging the top surface of the base. Screws 8 serve to lock rigidly the strap and holders onto the base.

As explained previously, the strap 4 is wrapped around the assembled holders in a position intermediate the ends thereof, the purpose of this particular location being to increase the efficiency of heat conduction and dissipation from the various tubes. It has been discovered that the dissipation of the heat generated by the tubes is most efficient when the strap 4 is located near the axial center of the holder, the reason for this result being attributed to the belief that the majority of heat generated by the tube occurs near the axial center thereof. Therefore, the path of heat conduction is the shortest at the exact location where the concentration of heat in the tube is the greatest.

In the operation of miniature and sub-miniature tubes, the efficient cooling of the tube is very important, since the heat generated by the tube itself affects the operational characteristics thereof.

In Fig. 3 is shown another arrangement of assembled holders in which three incomplete cylinders 1 are banded together by the strap 13. Apertured ears 14 are provided on opposite sides of the strap 13 for mounting the assembly on a chassis base plate as illustrated in Fig. 1. The operation of this three tube holder, and the advantages thereof, are substantially identical to those of the four tube arrangement of Fig. 2.

It will now be apparent, from the foregoing explanation and description, that both of the illustrated embodiments of this invention serve to conserve space since the tube are gathered together in a small bundle as contrasted with the arrangement where the tubes are widely separated on the chassis, and since the assembly projects through the chassis base-plate. This latter feature reduces the height of the equipment above the chassis base plate. With the retaining strap 4 attached to the assembly of holders between the ends thereof, offsetting the holders through the chassis is made possible, and further the conduction of heat from the respective tubes is facilitated since the strap, as explained previously, is located at the position where the concentration of heat is the greatest. This heat conduction is further facilitated by the fact that the heat communicated to the individual holders need only travel approximately one half the length of the holder before being conducted away to the chassis.

While there has been described what are at present considered preferred embodiments of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A mounting device for securing a plurality of vacuum tubes in position, each vacuum tube including an electrode-enclosing envelope, comprising a plurality of resilient cylinders which are C-shaped in cross-section serving as tube holders, each holder having a tube-receiving opening therein which is radially adjustable, each holder being made of heat-conducting material, and means securing all of said cylinders contiguously together in a cluster, said means being operable to adjust the size of the openings of all holders simultaneously.

2. A mounting device for securing a plurality of vacuum tubes in position, each vacuum tube including an electrode-enclosing envelope, comprising a plurality of axially split cylinders serving as tube holders, each holder having a tube-receiving opening therein which is independently radially adjustable, a strap member securing all of said holders in assembly and being positioned intermediate the ends of the latter, said strap member being adjustable to exert radial pressure on all of said holders for adjusting the size of all of said tube-receiving openings simultaneously, and means on said strap member for attaching the assembly to a chassis.

3. A mounting device for securing a plurality of vacuum tubes in position, each vacuum tube including an electrode-enclosing envelope, comprising a plurality of cylindrical tube holders, each holder being made of heat-conductive material and split axially so as to provide for radial expanding and contracting adjustment thereof, a heat-conducting strap member securing all of said holders together and being positioned intermediate the ends of said holders, said strap being adjustable to exert radial pressure on said holders for adjusting the size of the tube-receiving openings thereof, and heat-conducting mounting means on said strap for attaching the assembly to a chassis.

4. A mounting device for securing a plurality of vacuum tubes in position, each vacuum tube including an electrode-enclosing envelope, comprising a plurality of resilient axially split cylinders serving as tube holders, each holder being made of heat-conductive material and having a tube-receiving opening therein which is radially adjustable, a heat-conducting strap member securing all of said holders in assembly and being positioned intermediate the ends of said holders, said strap being adjustable to exert radial pressure on said holders for adjusting the size of said tube-receiving openings, and heat-conducting mounting means on said strap for attaching the assembly to a chassis.

5. A mounting device for securing a plurality of vacuum tubes in position, each vacuum tube including an electrode-enclosing envelope, comprising a plurality of cylindrical tube holders, each holder being split axially so as to provide for radial expanding and contracting adjustment thereof, a retaining member securing all of said holders in assembly and being positioned intermediate the ends of said holders, the split portions of said holders being symmetrically arranged adjacent the radial center of the assembled holders, said retaining member being adjustable to exert radial pressure on said holders for adjusting the size of the tube-receiving openings thereof simultaneously, and means on said retaining member for attaching the assembly to a chassis.

6. A mounting device for securing a plurality of vacuum tubes in position, each vacuum tube including an electrode-enclosing envelope, comprising a plurality of metal tubular members, each of said members having a tube-receiving opening therein and being split axially so as to have a cross-sectional shape of an incomplete annulus, a heat-conducting strap grippingly surrounding all of said members for holding the latter in an axially aligned assembly and being positioned intermediate the ends of the assembly, said strap member being operable to exert pressure on said members for varying the size of said tube-receiving openings, said members being grouped to dispose the split portions thereof symmetrically adjacent the radial center of the assembly, and heat-conducting mounting ears provided on opposite sides of said strap member for attaching the assembly to a chassis.

References Cited in the file of this patent

UNITED STATES PATENTS

| 1,795,884 | Parker | Mar. 10, 1934 |
| 1,959,633 | Madden | May 22, 1934 |
| 2,489,481 | Chester | Nov. 29, 1949 |
| 2,653,181 | Millett | Sept. 22, 1953 |